US006985263B2

(12) United States Patent
Georgiev et al.

(10) Patent No.: US 6,985,263 B2
(45) Date of Patent: *Jan. 10, 2006

(54) GENERATING REPLACEMENT DATA VALUES FOR AN IMAGE REGION

(75) Inventors: Todor G. Georgiev, Sunnyvale, CA (US); Mark Hamburg, Scotts Valley, CA (US); Jen-Chan Chien, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/464,280

(22) Filed: Jun. 17, 2003

(65) Prior Publication Data

US 2003/0210828 A1    Nov. 13, 2003

Related U.S. Application Data

(63) Continuation of application No. 09/991,254, filed on Nov. 16, 2001, now Pat. No. 6,587,592.

(51) Int. Cl.
  *H04N 1/387* (2006.01)
  *H04N 1/409* (2006.01)
  *H04N 1/62* (2006.01)
  *G06T 5/20* (2006.01)
  *G06T 5/50* (2006.01)

(52) U.S. Cl. .................... 358/3.26; 385/531; 385/537; 385/453; 382/254; 382/268; 382/275

(58) Field of Classification Search ................ 382/275, 382/268, 254, 282, 205, 260, 112; 358/3.26, 358/3.27, 527, 531, 452, 453, 463, 537, 538
See application file for complete search history.

(56) References Cited

U.S. PATENT DOCUMENTS 6,141,459 A    10/2000  Gendel
6,266,054 B1   7/2001   Lawton et al.
6,587,592 B2 * 7/2003   Georgiev et al. ........... 382/254

OTHER PUBLICATIONS

Marcelo Bertalmio et al, "Image Painting", Proceedings of SIGGRAPH 2000, New Orleans, USA, Jul. 2000 (2 versions).

William L. Briggs, "A Multigrid Tutorial", copyright 1987; chapter 1-3.

Anil N. Hirani et al, "Combining Frequency and Spatial Domain Information for Fast Interactive Image Noise Removal", Proceedings of SIGGRAPH 96 (New Orleans, LA, Aug. 4-9, 1996). In *Computer Graphics* Proceedings, Annual Conference Series, 1996, ACM SIGGRAPH, pp. 269-276.

(Continued)

*Primary Examiner*—Scott A. Rogers
(74) *Attorney, Agent, or Firm*—Fish & Richardson P.C.

(57) ABSTRACT

Given an image with an unwanted feature, a collection of pixels (a defined region) entirely containing the unwanted feature is designated, and replacement data values for the defined region are generated, thereby healing the unwanted feature. A selected image region is healed by propagating values in a boundary region into replacement data values for the selected image region by iteratively applying a procedure or algorithm (e.g., iteratively applying one or more kernels), such that values in the boundary region are continuously put back into the iterative calculations. An example of such a function uses kernels to generate replacement data values having multiple orders of continuity at the boundary. Optionally, replacement data values for an image region to be healed are generated based on a difference between existing data values and texture data values, thereby introducing texture (e.g., pattern, noise) components to a resulting healed region in the image. Mutiresolution processing and tiling can also be used to enhance performance.

20 Claims, 11 Drawing Sheets

OTHER PUBLICATIONS

Homan Igehy et al, "Image Replacement Through Texture Sythesis", *Proceedings of the 1997 IEEE International Conference on Image Processing.*

Manuel M. Oliveira, "Fast Digital Image Inpainting", Proceedings of the International Conference on Visualization, Imaging and Image Processor (VIIP 2001), Marbella, Spain, Sep. 3-Sep. 5, 2001, pp. 261-266.

* cited by examiner

FIG. 4

450 — Kernel (divisor = 4):

| 0 | 1 | 0 |
|---|---|---|
| 1 | 0 | 1 |
| 0 | 1 | 0 |

KERNEL DIVISOR=4

460 — Kernel (divisor = 32):

| 0 | 0 | -1 | 0 | 0 |
|---|---|----|---|---|
| 0 | -2 | 8 | -2 | 4 |
| -1 | 8 | 12 | 8 | -1 |
| 0 | -2 | 8 | -2 | 0 |
| 0 | 0 | -1 | 0 | 0 |

KERNEL DIVISOR=32

470 — Kernel (divisor = 256):

| 0 | 0 | 0 | 1 | 0 | 0 | 0 |
|---|---|---|---|---|---|---|
| 0 | 0 | 3 | -12 | 3 | 0 | 0 |
| 0 | 3 | -24 | 57 | -24 | 3 | 0 |
| 1 | -12 | 57 | 144 | 57 | -12 | 1 |
| 0 | 3 | -24 | 57 | -24 | 3 | 0 |
| 0 | 0 | 3 | -12 | 3 | 0 | 0 |
| 0 | 0 | 0 | 1 | 0 | 0 | 0 |

KERNEL DIVISOR=256

480 — Kernel (divisor = 2048):

| 0 | 0 | 0 | 0 | -1 | 0 | 0 | 0 | 0 |
|---|---|---|---|----|---|---|---|---|
| 0 | 0 | 0 | -4 | 16 | -4 | 0 | 0 | 0 |
| 0 | 0 | -6 | 48 | -112 | 48 | -6 | 0 | 0 |
| 0 | -4 | 48 | -216 | 400 | -216 | 48 | -4 | 0 |
| -1 | 16 | -112 | 400 | 1372 | 400 | -112 | 16 | -1 |
| 0 | -4 | 48 | -216 | 400 | -216 | 48 | -4 | 0 |
| 0 | 0 | -6 | 48 | -112 | 48 | -6 | 0 | 0 |
| 0 | 0 | 0 | -4 | 16 | -4 | 0 | 0 | 0 |
| 0 | 0 | 0 | 0 | -1 | 0 | 0 | 0 | 0 |

KERNEL DIVISOR=2048

GENERATING REPLACEMENT DATA VALUES FOR AN IMAGE REGION

CROSS REFERENCE TO RELATED APPLICATIONS

This application is a continuation (and claims the benefit of priority under 35 USC 120) of U.S. application Ser. No. 09/991,254, filed Nov. 16, 2001 now U.S. Pat. No. 6,587,592.

BACKGROUND

The present application describes systems and techniques relating to generating new data values for an image region, for example, generating replacement data values to heal defective pixels using boundary conditions and/or using a sample of textured data values.

Traditional techniques for removing unwanted features from images include wire removal techniques such as used in movies, dust and scratches filters used in software applications such as PHOTOSHOP®, provided by Adobe Systems, Inc. of San Jose, Calif., inpainting and other algorithms. In typical replacement pixel data generation techniques, selected pixels in an image are regenerated based on values of the pixels bordering the selected pixels, and first and second order partial differential equations (e.g., the Laplace equation). For example, traditional inpainting techniques generally are based on second order the Laplace equation and/or anisotropic diffusion. These techniques typically result in noticeable discontinuities at the edges of the inpainted region.

Other techniques of generating replacement data values in an image region include applying area operations such as blurring or performing median calculations (e.g., using Gaussian filters and median filters) at each pixel in the selected region. The image area, or neighborhood, used for the area operation generally will include one or more selected pixels with undesirable data values. Thus, the neighborhood needs to be large enough to swamp the contributions of the undesirable pixel data. Oftentimes, a user must specify how large to make the neighborhood to minimize the effects of the undesirable data values. For example, techniques that are based on frequency domain separations generally require that the user specify a neighborhood size that will be used by the filter that separates gross details from fine details.

Some conventional techniques also apply a high-frequency component from another image to a healed region after it has been modified to replace defective pixel values. But the results of such traditional techniques for removing unwanted features of an image often do not reflect the true properties of most images. Areas of images that are filled-in using conventional techniques frequently have discontinuities at the boundary of the filled-in region and/or look blurred or otherwise appear to lack detail. These filled-in areas are often easily noticed and do not look like a natural part of the image, either because the surrounding areas are textured, or because pixel intensity changes sharply at the boundary of each filled-in area.

SUMMARY

In one aspect, a selected image region is healed by propagating values in a boundary region into replacement data values for the selected image region by iteratively applying a procedure or algorithm (e.g., iteratively applying one or more kernels), such that values in the boundary region are continuously put back into the iterative calculations. An example of such a function uses kernels to generate replacement data values having multiple orders of continuity at the boundary. Optionally, replacement data values for an image region to be healed are generated based on a difference between existing data values and texture data values, thereby introducing texture (e.g., pattern, noise) components to a resulting healed region in the image. Mutiresolution processing and tiling can also be used to enhance performance.

In another aspect, a method of processing an image includes determining boundary pixels bounding a modification region in an image, the boundary pixels having values and being outside the modification region, and generating new pixel values for the modification region using the boundary pixel values such that a rate of a rate of change in pixel values is minimized from the boundary pixel values to new modification region pixel values. The generation of new pixel values can be performed for multiple channels to create similar overall gradations of color and illumination from the boundary pixel values to new modification region pixel values. The generation of new pixel values also can be performed by iteratively applying multiple kernels.

Multiresolution processing can be used to improve performance. If the image can be an image saved using a lossy compression technique (e.g., a JPEG image), this can be detected and the modification region can automatically set equal to one or more compression artifact regions between compression blocks.

In another aspect, a method of processing an image includes subtracting texture pixel values from pixel values corresponding to at least a portion of an image, generating new pixel values for a modification region of the image using the texture-subtracted pixel values, adding texture pixel values to the new pixel values, and writing the texture-added new pixel values to the image. The texture pixel values can be pixel values from a texture image having high frequency components or a repeating or non-repeating pattern. The new pixel value generation can be performed by iteratively applying a kernel.

The new pixel value generation can be performed by iteratively applying multiple kernels to create a continuous rate of change in pixel values from boundary pixel values to new modification region pixel values. The new pixel value generation can be performed by iteratively applying the multiple kernels at multiple resolutions of the image, starting with a lowest resolution version of the image. Each kernel can be applied separately to the multiple resolutions of the image, starting with the smallest kernel. Image tiling can be used, including padding between tiles to accommodate a largest kernel from the multiple kernels.

Conversion to a higher precision value representation (e.g., a fixed point value representation) can be performed before applying the multiple kernels. Each image can be blurred before applying the multiple kernels at a level. These techniques can be used to process multiple channel images.

Implementations of the systems and techniques described here may occur in hardware, software or a combination of both, and may include machine instructions for causing a machine to perform the operations described.

One or more of the following advantages may be provided. The systems and techniques described may result in significantly improved healing of image regions having unwanted features. Images healed using these systems and techniques may have a smooth transition from inside a healed region to outside the healed region. When applied to multiple channels in a color image, the resulting image may have similar overall gradations of color and illumination across the boundary of the selected region. Texture components may be added to a healed region allowing it to blend in with its surroundings, thereby making the healed region visually unnoticeable.

In addition, these systems and techniques may result in reduced processing time, and may reduce memory usage. For instance, generating replacement data values based on the difference between existing data values and texture data values may reduce processing time by half. Other than designating the pixels to be healed, and optionally a corresponding texture image, no filter parameters are required, because the shape of the healing region can be used to determine all remaining parameters needed to heal the image.

BRIEF DESCRIPTION OF THE FIGURES

FIG. 4 is an illustration of four kernels that may be used in the processes of FIGS. 2A and 2B.

Details of one or more embodiments are set forth in the accompanying drawings and the description below. Other features and advantages may be apparent from the description and drawings, and from the claims.

DETAILED DESCRIPTION

The systems and techniques described here relate to generating new data values for an image region. These new data values are generated using boundary pixel data values and/or by using a sample of textured data values. These new data values can be written into the image region to heal an image, or can be used as input for further processing. The terms "texture" and "textured" encompass both small-scale and large-scale patterns, ordered and/or repeating patterns, and unordered and/or non-repeating patterns. The term "heal" means modification of an image to effect a desired change, and generally includes the concept of removing any unwanted feature of an image. Furthermore, the following description frequently discusses image healing in the context of discrete images, which are images composed of a finite set of pixel data values (e.g., 24 bit per pixel digital images such those used in RGB (Red, Green, Blue) color systems), but may apply equally in other contexts, including other data bit-to-pixel schemes and other color spaces.

Examples of unwanted image features include artifacts that have arisen through an image capture or storage process (e.g., scratches, dust, JPEG (Joint Photographic Experts Group compression technique) compression artifacts, or other imperfections that do not correspond to an underlying abstract image), and unwanted elements in an image (e.g., wires in a special effects shot, graffiti, or any other undesirable feature of an underlying abstract image). The system and techniques described can be used to remove or alter relatively large elements of an image, thereby serving as a creative tool in addition to a tool for removing small artifacts.

In the following description, various operations are described as being performed on, or applied to, an image or portions of an image. In general, these operations can be performed on the image or image portion directly or can be performed on one or more copies of the image or image portion. Under certain circumstances, performance advantages may arise by making one or more copies of an image or image portion and then applying the image processing operations to the copies rather than to the original image directly. When processing is described with respect to an "image", this processing may be performed against an original image, a portion of an original image, a copy of an original image, a copy of a portion of an original image, a portion of a copy of an original image, or additional copies/portions of any of these. When processing is described with respect to an "image copy", this processing alternatively may be performed against the original image.

Figure 1:
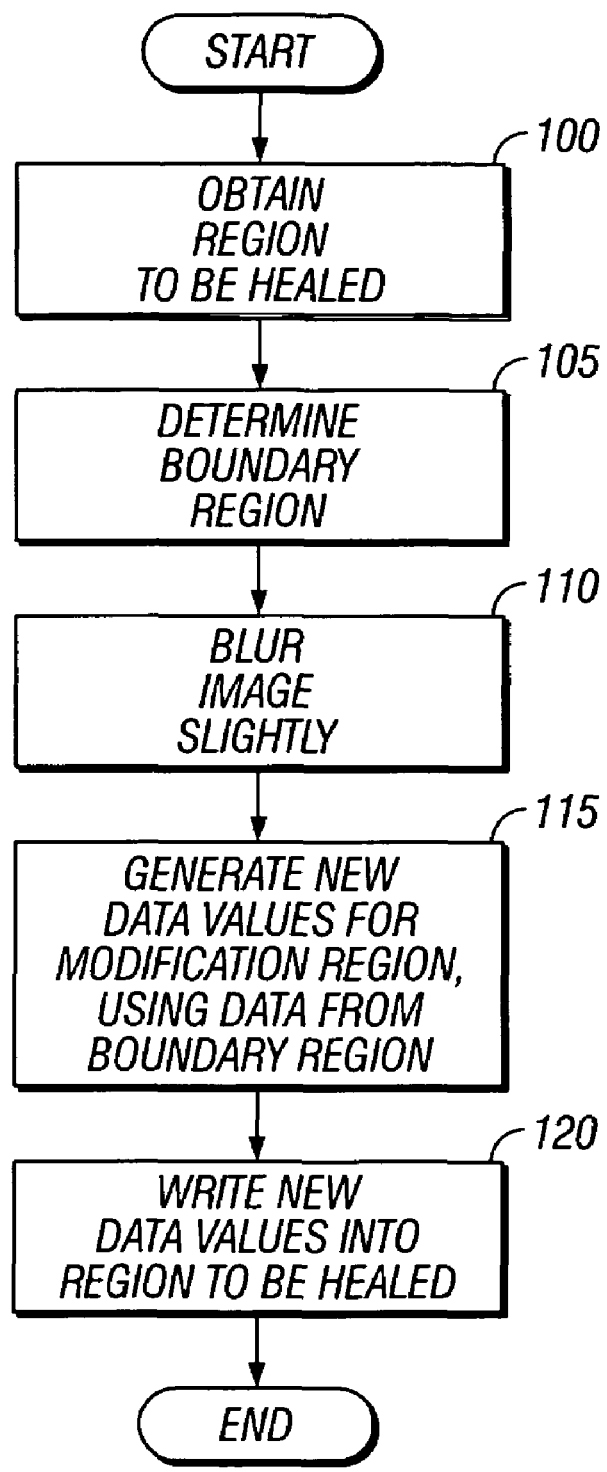
FIG. 1 shows a process for generating new data values for a region of an image using data values bounding the image region.

FIG. 1 shows a process for generating new data values for a region of an image using data values bounding the image region. The process begins by obtaining information defining an image region to be healed (100). The region to be healed may be identified in a number of different manners depending upon the application. For example, a user of a software program can use a brush tool to paint a mask onto the image, thereby defining the region. The brush tool can have clearly defined edges or it may represent a density function (e.g., the brush may have fuzzy or feathered edges). Or a user can designate a mask (e.g., using selection tools such as those in PHOTOSHOP® software).

Alternatively, the region to be healed may be identified automatically. For example, a feature recognition or statistical analysis can be performed on an image to identify artifacts or other undesirable features. Large scale edges can be detected in an image, or if the image represents a paper document, which typically should include only characters and/or graphics, a program can scan the image for boundary defined regions of the image that are neither characters nor graphics. If the image is a JPEG image, the two-pixel boundary of each JPEG block can be identified automatically as the region(s) to be healed.

Once a mask or other information defining a modification region to be healed is obtained, a boundary region for the modification region is determined (105). The boundary region is a set of pixels that bounds the modification region and extends outward from the modification region far enough to support the generation of new pixel data values as discussed below. For example, the boundary region may be a two-pixel deep band surrounding the modification region.

Following this, a blur optionally can be applied (against a copied version of an original image) in order to cut off high frequencies and better preserve edges by reducing spurious data slopes caused by noise in the boundary region (110). Then new pixel data values are generated for the modification region using data values from the boundary region (115). The new pixel data values for the modification region are such that, when written to the modification region, the resulting image has continuous values and continuous change in values at the boundary. This is accomplished for the modification region by minimizing a rate of a rate of change in pixel data values, in addition to a rate of change in pixel data values, from the boundary pixel data values to new pixel data values for pixels in the modification region. Put another way, the slope of the change in pixel data values is continuous across the boundary, thereby making the edges of each modification region smooth.

For example, for a multi-channel discrete image, such as an RGB image, smoothness in pixel data values at the boundary can be created for all three channels, thus resulting in similar overall gradations of color and illumination across the boundary of the modification region when the new pixel data values are written into the modification region. The resulting image is noticeably smoother at the boundary of the modification region. The description below discusses only the single channel case, but the systems and techniques described below are equally applicable to multi-channel images. Additionally, these systems and techniques can be used with multiple color spaces, either separately or concurrently. For example, an image can be converted into another color space (e.g., an RGB image can be converted to an LUV or a YUV color space), healed in that other color space, and then converted back.

This smoothness at the boundary can be improved by creating more than two orders of continuity at the boundary. This process may be understood mathematically in terms of continuous functions and continuous derivatives of functions. More particularly, the underlying abstract image can be represented mathematically as an image function. Similarly, a portion of the image corresponding to the modification region plus the boundary region also can be represented as an image function. The new pixel data values are generated such that, when placed in the modification region of the image, the resulting image function corresponding to the modification region plus the boundary region is continuous, the first derivatives of that function are continuous and one or more higher derivatives (second, third, etc.) are continuous. In other words, the new pixel values depend not only on the pixel values at the boundary, but also on multiple higher order partial derivatives of the pixel values in the boundary region, which is two or more pixels wide, thereby producing increased smoothness at the boundary.

Following generation of the new pixel data values, these data values can be written into the modification region of the image to be healed (120), or used as inputs for further image processing.

Figure 2A:
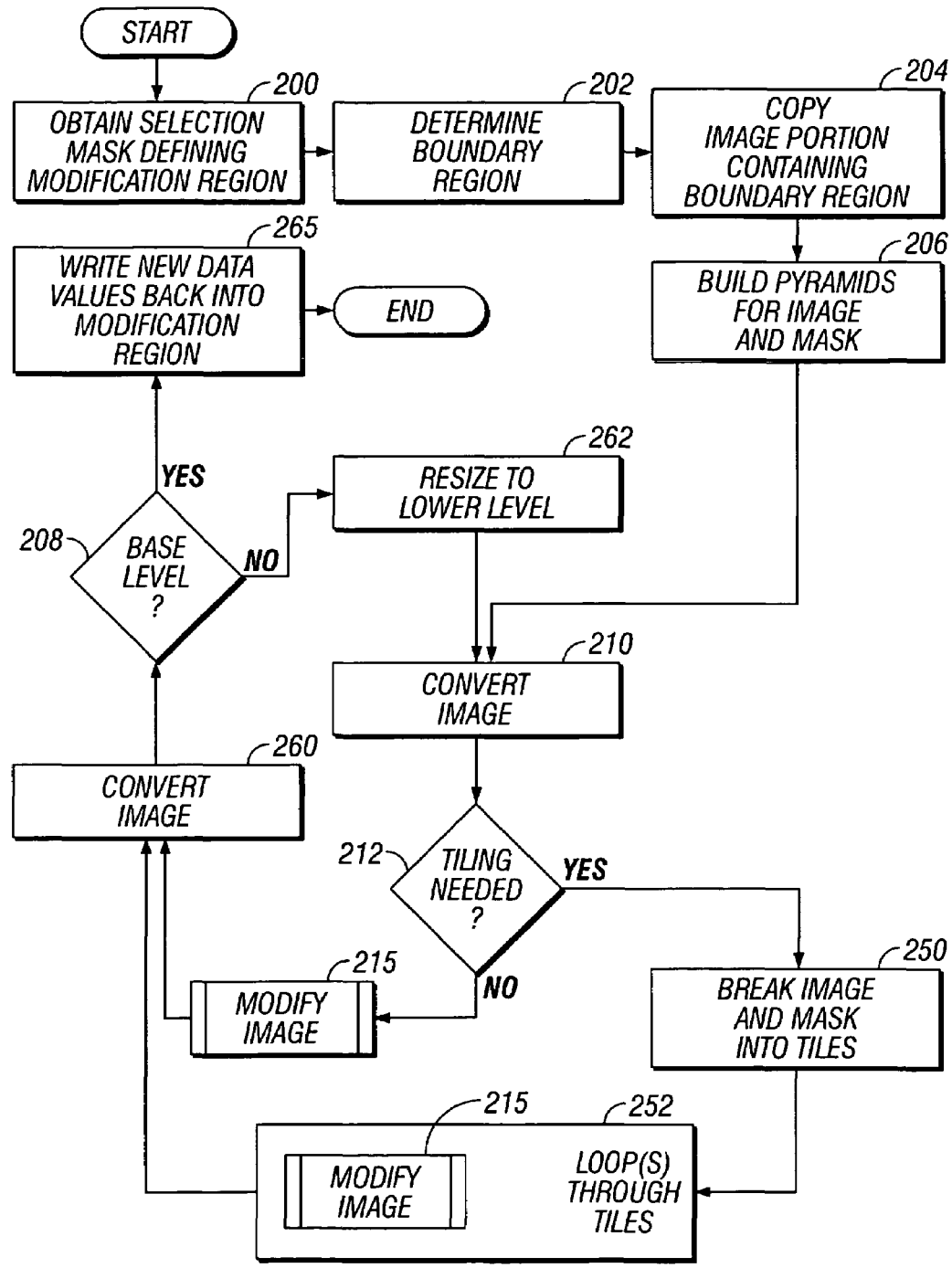
FIG. 2A shows an example process for generating new pixel data values for a region of an image using multiresolution processing and image tiling.

FIG. 2A shows an example process for generating new pixel data values for a region of an image using multiresolution processing and image tiling, which optionally can be used to enhance performance. Multiresolution processing involves generating multiple different resolutions of an image, and then successively processing each different level (from the lowest resolution to the highest resolution) passing information from one processing level down to the next until converging on a final result.

The process begins by obtaining a selection mask defining a modification region of an image (200). The selection mask can be obtained manually or automatically as described above. The selection mask identifies which pixels of the image have been selected to be modified, and thus which pixels are included in the region to be healed.

Then, a boundary region is determined for the selected modification region using the selection mask (202). Next, a portion of the image containing the boundary region and the modification region is copied (204). Depending on the size of the boundary and modification regions, the copied portion may include the entire image or subset of it. For example, the smallest rectangle that contains the boundary region (i.e., a bounding box) can be built, and the data values in this smallest rectangle are then copied.

Then, a pyramid of lower resolution versions of the image and the selection mask are created (206). Each higher level in the pyramid can be 2×2 times smaller in resolution than the previous level. Both the image and the selection mask are resampled to create two pyramids (an image pyramid and a mask pyramid) of lower resolution versions.

For each pyramid, processing begins at the top (lowest resolution) level. The current level image is converted to a higher precision value representation (210). For example, if the current level image is either an 8-bit or 16-bit image (e.g., an RGB image), a value representation greater than 16-bits is used (e.g., a 32-bit fixed point representation, a 32-bit floating point representation, a 32-bit integer representation, etc.). By using a higher precision value representation of the pixel data values, changes in pixel values that are smaller than the usual quantum of pixel values can be handled. Negative numbers also can be handled, as will be discussed further in connection with FIG. 6. An optional blur can also be applied just before conversion in order to better preserve edges.

Next, a check is made to determine if the current level image is larger than a predefined maximum size (212). If not, control passes to a defined process to modify the current level (215), which generates new pixel data values for the selected pixels in the current level based on the mask at that level. For example, the process shown in FIG. 2B can be used as the defined process (215).

Otherwise, if the current level image is larger than the predefined maximum size, tiling is used. The image and the mask are broken into tiles (250). The image tiles each include padding to sample from adjacent areas, but the mask tiles do not have padding. The tiles may be boundary definitions within the image and mask or separate copies of data from the image and mask. By breaking the image into tiles, images of arbitrarily large size can be processed.

Following tiling, all the tiles for the current image level are looped through (i.e., processed sequentially using a pre-defined order) (252) using the defined process (215) to modify each image tile. This can involve an initial check for each tile that the tile contains a portion of the modification region before processing the tile with the defined process (215). Once all the tiles have been processed, a check is made to determine if additional loops through the tiles are needed. This check may involve analysis of the image (i.e., a convergence test) and/or a count of the number of times the whole image has been processed. Moreover, breaking the image into tiles and looping through the tiles may be combined such that each tile is processed as soon as it is broken out of the image (e.g., loaded into a buffer for processing). Alternatively, an algorithm can check whether padding pixels supplied by a tile to its neighboring tiles have changed, and those neighboring tiles can be added to a work list if those padding pixels have changed, which avoids having to visit all of the tiles if most of the image has already converged (taking round off issues into consideration).

For iterative processing using a kernel as described below, application of a small kernel has a similar effect to applying a very large kernel, and thus may require a large amount of padding among tiles. By performing multiple loops through the tiles, any such need for a large amount of padding among tiles can be eliminated. Typically, only two or three loops through all the tiles is sufficient to eliminate any traces of iterative tiled processing.

However, different types of unwanted features may lead to different numbers of loops through the tiles. For example, when using the process described here to remove compression artifacts from a JPEG image, only a small number of loops through the tiles may be needed. Moreover, when using this process on detected large scale edges in an image, the healing may be applied differently in order to reduce damage.

During subsequent loops through the tiles, various process elements may function differently to improve performance. For example, each subsequent loop through the tiles can involve a different order of looping through the tiles (e.g., a ninety degree rotation between loops (first loop is left to right and top to bottom, second loop is top to bottom and right to left, and so on, or a one hundred and eighty degree rotation between loops).

Once all the loops through the tiles have been performed and the current image level has been fully modified, the current level is converted from the higher precision values back to the appropriate values for the pixel data storage scheme (e.g., 8-bit pixel values) (260). While the base level has not been reached (208), processing of the next level proceeds. The current level image is resized to the next lower level in the pyramid (262). For example, the current level image may be resized by resampling, and data within the selected region is then copied from the resized current level image into the next level to be processed.

Once the base level is reached, the newly generated pixel data vales for the selected region can be written back into the modification region of the original image (265). The multiresolution (or multiscale) processing depicted in FIG. 2A and described above can improve the speed with which final replacement data values are generated. The lower-resolution versions of the image reach stability rapidly because there are few pixels to heal and the selected region is relatively small. The higher-resolution versions of the image reach stability rapidly because they use the data generated on the prior level and thus start out close to being healed already. The iterations at lower levels of the pyramid fill in detail that can be lost in the downsampling to the next level.

Figure 3A:
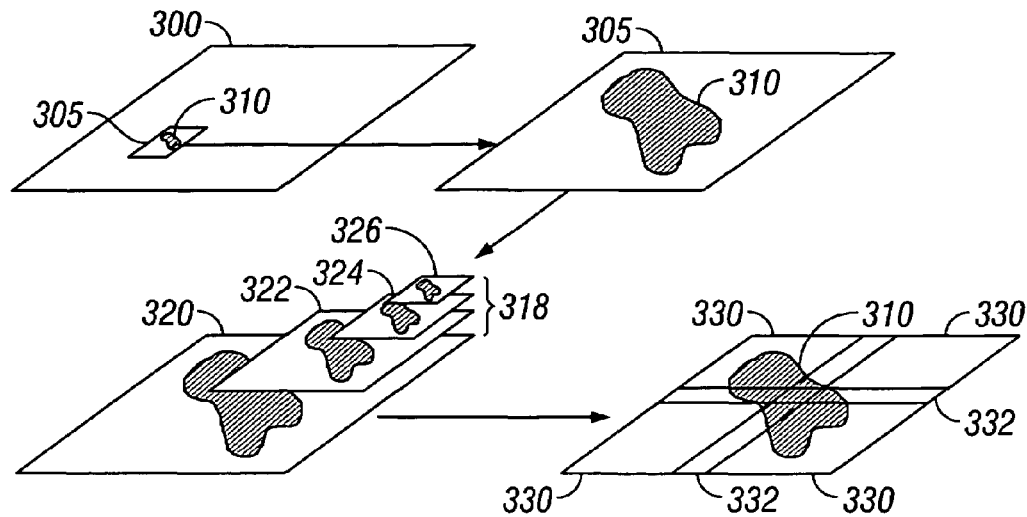
FIG. 3A is a perspective view of an image, a portion of an image, a pyramid of images, and image tiles, illustrating the process of FIG. 2A.

FIG. 3A is a perspective view of an image, a portion of an image, a pyramid of images, and image tiles, illustrating the process of FIG. 2A. An image 300 includes an identified modification region 310, which may be specified by a selection mask (not shown). A portion of the image 300 containing the identified region 310 is then identified, such as by determining a bounding box containing the identified region and the boundary region to define an image 305.

Next, a pyramid 318 of lower resolution versions of the image 305 is built, such as a base level 320, a quarter area image 322, a one sixteenth area image 324 and a one sixty fourth area image 326. This pyramid 318 is then processed from the top level 326 to the bottom level 320, the results at each level being resampled to the next lower level before processing of that lower level.

If any of the image versions 320, 322, 324, 326 are larger than a maximum size, that image version is broken up into tiles with padding. For example, in FIG. 3A, image version 320 (representing the base level of the pyramid 318) is broken up into four tiles 330 with padding 332, which is an overlap region common to adjacent tiles. Then each tile is processed as a separate image.

The amount of padding 332 used typically will depend on the size of the kernel to be applied. For example, the padding 332 may be an amount needed for a current kernel to be applied, or it may be an amount of padding needed for the largest kernel to be applied (e.g., if the largest kernel to be used on the tiles is seven by seven, three pixels of padding is needed around each tile). Application of the kernels and their various sizes is discussed further below.

Figure 2B:
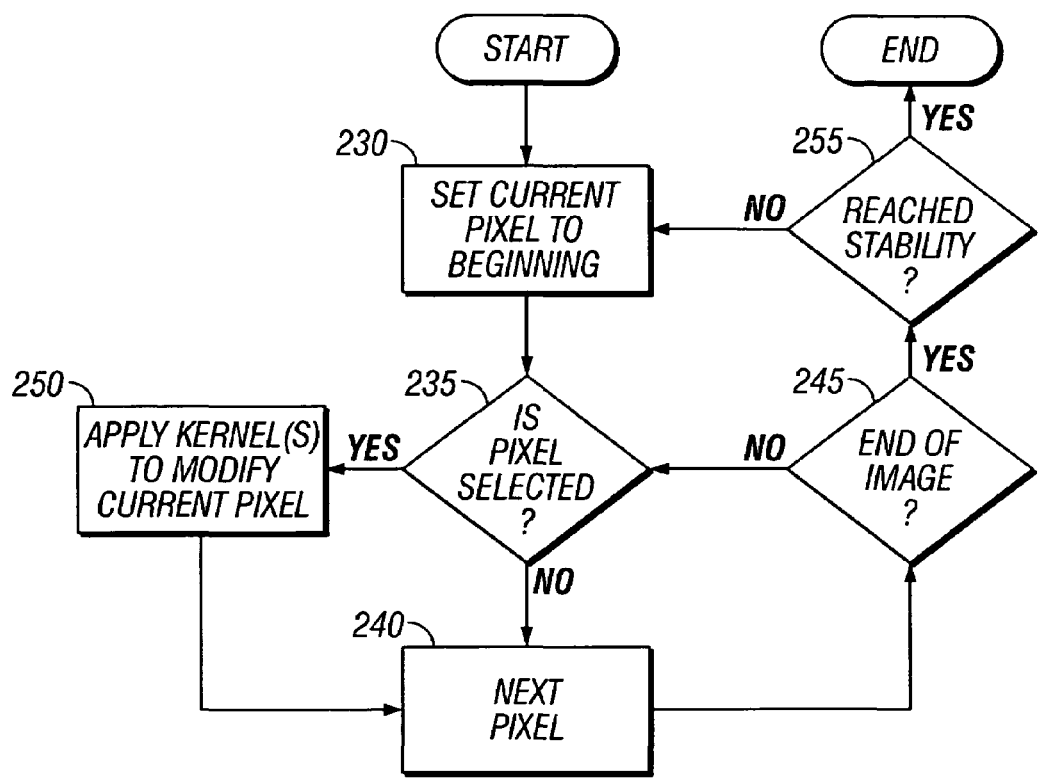
FIG. 2B shows an example process for generating new pixel data values for a region of an image at one level, using pixel data values bounding the image region at that level.

FIG. 2B shows an example process for generating new pixel data values for a region of an image at one level, using pixel data values bounding the image region at that level. The process of FIG. 2B can be used as the defined process 215 from FIG. 2A. The process begins by setting a current pixel to be processed to the beginning of an image (230). Then, a check is made to determine if the current pixel is selected (i.e., part of the modification region) (235). For example, a selection mask may be checked to determine if a value corresponding to the current pixel is non-zero.

If the current pixel is a selected pixel, one or more kernels are applied to the image to modify the current pixel (250). Typically one kernel is applied per pass over the image. Then, or in the event that the current pixel is not selected, the next pixel becomes the current pixel (240). Pixels continue to be checked and processed until the end of the image is reached (245).

Once the end of the image has been reached, a check is made to determine if a state of stability has been reached (255). If not, the current pixel is set back to the beginning of the image and the image is reprocessed. If stability has been reached, the process ends.

Determining stability in the image is accomplished by analyzing recent changes in pixel data values (taking into account the potential for round off error preventing perfect convergence). For example, a maximum pixel change amount may be tracked in each pass through the image. Once the maximum pixel change amount for a complete pass through the image drops below a threshold, a state of relative stability has been reached.

Alternatively, the image is processed a set number of times, possibly using different orientations (i.e., different orderings for the pixels for each pass through the image). For example, the image may be completely looped through one hundred to several hundred times. Or a combination of a counter and stability analysis can be provided.

Figure 3B:
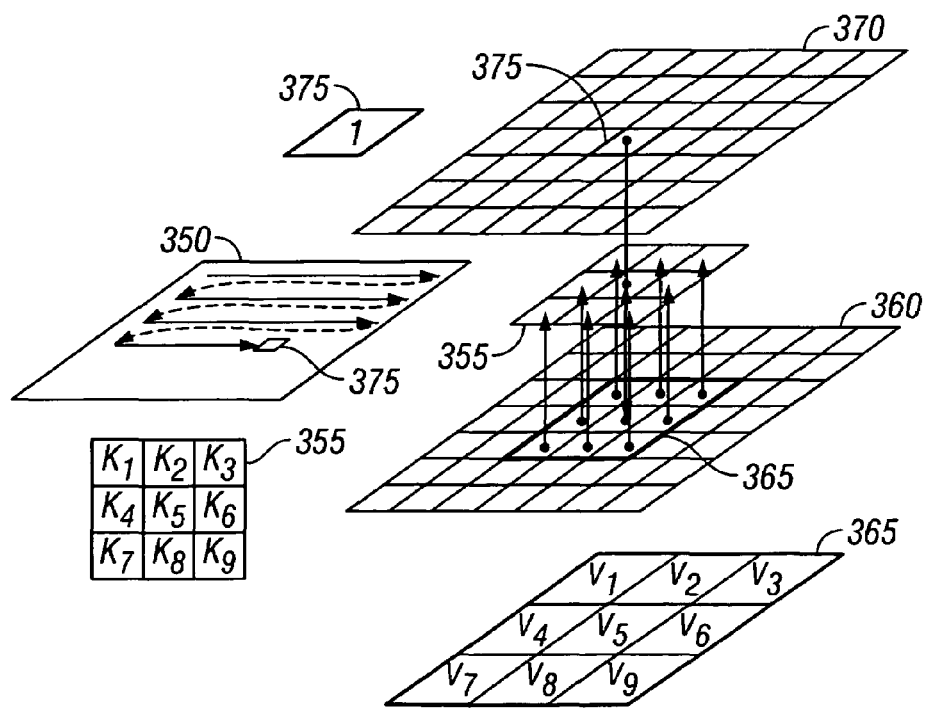
FIG. 3B is a perspective view of an image, a kernel area, a portion of an image, a set of image pixels and a portion of an image mask, illustrating the process of FIG. 2B.

FIG. 3B is a perspective view of an image 350, a kernel area 355, a portion of an image 360, a set of image pixels contained in a kernel shadow 365 and a portion of an image mask 370, illustrating the process of FIG. 2B. The image 350 includes pixels arranged in a rectangle. These pixels may be processed sequentially from left to right and top to bottom. In the case of processing using different orientations for each pass through an image, the image is effectively rotated ninety degrees (or one hundred and eighty degrees) for each complete pass through the image.

The process of FIG. 2B represents an iterative convolution of a kernel with an image that modifies the image in place. A kernel 355 is applied at a current pixel and modifies the current pixel data based on the current pixel's value and surrounding pixel data values. For example, an image portion 360 includes pixels and is part of the image 350. The image portion 360 has a corresponding image mask portion 370. The current pixel has a corresponding mask location 375 in the image mask portion 370. If the mask location 375 contains a value of one, the current pixel is selected, and the kernel 355 is applied.

The kernel 355 represents a mathematical operation that changes the current pixel data value based on the current pixel and surrounding pixels. The number of surrounding pixels included by the kernel depends on the size of the kernel and its constants. For example, the kernel 355 has a size of three by three and has constants $K_1$, $K_2$, $K_3$, $K_4$, $K_5$, $K_6$, $K_7$, $K_8$, $K_9$, When the kernel 355 is applied at the current pixel, a kernel shadow 365 is defined on the image portion 360, and pixel data values $V_1$, $V_2$, $V_3$, $V_4$, $V_5$, $V_6$, $V_7$, $V_8$, $V_9$ from shadow 365 are used in the calculation of the new pixel data value for the current pixel, according to:

$$V_5 = V_5 + \frac{\sum_{i=1}^{9} K_i \cdot V_i}{\text{KernelDivisor}} \quad (1)$$

One or more of the kernel constants $K_1$, $K_2$, $K_3$, $K_4$, $K_5$, $K_6$, $K_7$, $K_8$, $K_9$ maybe be zero. Thus, the particular surrounding pixels that affect the change in the current pixel depend both on the size of the kernel and the constants in the kernel.

Many different kernels may be used to generate new pixel data values that result in continuous values and continuous change in values at the boundary of the selected region. Moreover, multiple kernels may be used to generate new pixel data values that result in multiple orders of continuity at the boundary of the selected region.

For example, the kernels may be selected such that their iterative application results in a solution to a Laplace-type equation of orders higher than the traditional Laplace equation. Thus, each channel may be a solution of the Laplace equation with given boundary conditions:

$$\Delta f(x, y) = 0 \quad (2)$$

where $\Delta$ is the Laplace operator $$\Delta = \frac{\partial^2}{\partial x^2} + \frac{\partial^2}{\partial y^2}.$$

The solution is continuous at the boundary, but not smooth. The fourth order equation may be:

$$\Delta^2 f(x, y) = 0 \quad (3)$$

where $\Delta^2 = \Delta \cdot \Delta$ (i.e., Laplacean squared). The solution depends not only on the pixels at the boundary, but also on the rate of change of pixels (partial derivatives) at the boundary. So that inside and outside the slope is the same. This achieves a higher level of smoothness. The eighth order equation may be:

$$\Delta^4 f(x, y) = 0 \quad (4)$$

The solution depends on even higher partial derivatives at the boundaries, and helps to carry textures from outside the boundary into the replacement data values inside the boundary. One can think of this in terms of Taylor series expansion, where higher order terms are kept.

The processes described above may also be restructured to improve performance. For example, with reference to FIG. 2B, multiple kernels may be used overall but only one kernel at a time at 250. The process of FIG. 2B may be performed first using a lower order kernel (e.g., a kernel for iteratively solving the second order equation), which generally takes very few iterations to achieve stability. Then, using the result of this first pass as a starting point, the process of FIG. 2B may be performed again using a higher order kernel (e.g., a kernel for iteratively solving the fourth order equation). After this second pass, a yet higher order kernel (e.g., a kernel for iteratively solving the eighth order equation) may be used. Each higher order solution is also a solution of the lower order equation, but not every low order solution is at the same time a high order solution. However, the solutions tend to differ very little, so the above multi-iteration approach can greatly speed up convergence.

FIG. 4 is an illustration of four kernels that may be used in the processes of FIGS. 2A and 2B. A harmonic kernel 450 has kernel constants and a kernel divisor as shown. A harmonic kernel produces harmonic functions, which are solutions of the Laplace equation. A biharmonic kernel 460 has kernel constants and a kernel divisor as shown. A triharmonic kernel 470 has kernel constants and a kernel divisor as shown. A quadraharmonic kernel 480 has kernel constants and a kernel divisor as shown.

Other kernels are also possible. For example, the kernels selected need not be targeted specifically at preserving differential values to function according to the general approach described here, namely, the iterative application of a function, where values in a boundary region surrounding a selected region are continuously put back into the calculations so that those values are allowed to propagate into the replacement data values for the selected region. While the initial values of the selected pixel may be used in the computations, these initial contributions are significantly minimized through the iterative process that repeatedly feeds in the values of the boundary pixels back into the iterative recalculation of new values for the selected pixels.

Figure 5:
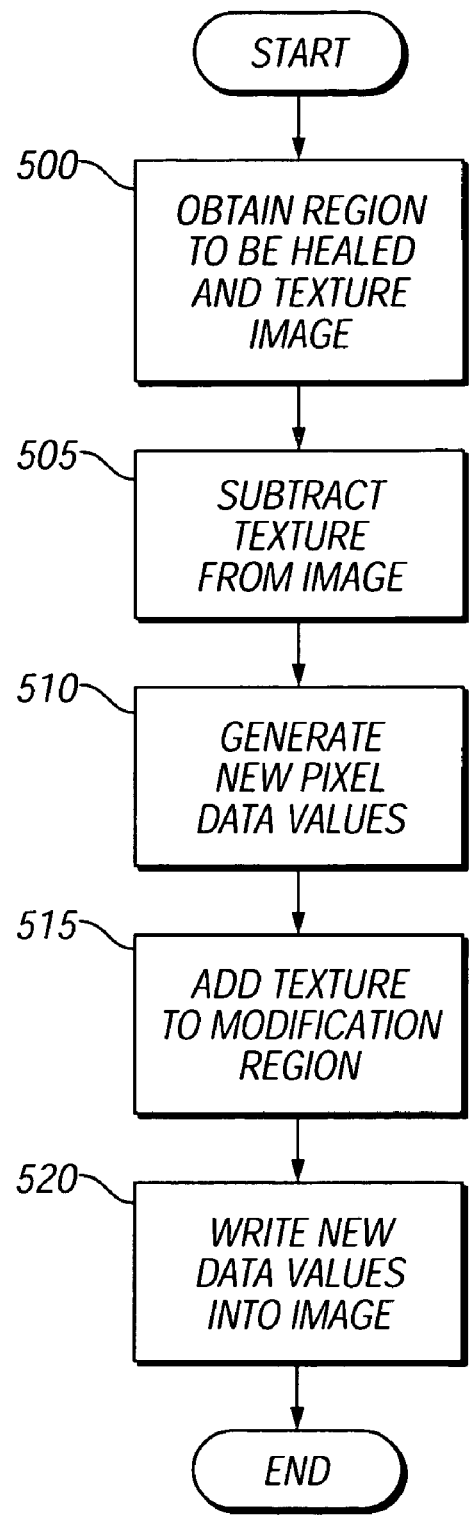
FIG. 5 shows a process for generating new data values for a region of an image using a set of data values representing a sample texture.

In addition to this iterative image healing approach, texture data may be added to a healed region using a texturing process in conjunction with a healing process, which may involve the iterative image healing approach described above. FIG. 5 shows a process for generating new data values for an image region using a set of data values representing a sample texture. The process begins by obtaining information defining an image region to be healed (a modification region) and a location identifying a texture image (500). For example, a user of a software program can specify a modification region, and specify a location from which to obtain image texture data, either in the same image or in another image. The location can be correlated with the first point of brush application for the modification region, thereby indirectly specifying a texture image that is an area of texture corresponding to the modification region (i.e., a user designates a texture image and a correspondence between the texture image and a target image to be healed). Alternatively, a user may specify the modification region, and then move an outline image of this region over another location in the same image or over another image to specify an area of texture.

Then, texture data values from an area surrounding the identified location are subtracted from the modification region and from a boundary region surrounding the modification region (505). Following this, replacement data values are generated for the modification region (510). These replacement data values are then changed by adding back the texture data values in the modification region (515). Finally, the data values in the modification region are written into the image, thereby healing the image (520).

For example, a copy of the image to be healed may be made. Then the whole image copy is changed by subtracting texture data irrespective of the modification region. The image copy may then be blurred slightly to remove any extreme high frequency noise. New data values are generated within the image copy. The whole image copy is changed, including the modification region by adding back the texture data. Then the new data values in the modification region are copied from the image copy back to the original image and the image copy is discarded.

The texture data may be high frequency data, noise or patterned data. These various options are discussed further below. By generating replacement data values using the difference between the original data and the texture data, various texture, patterns and/or noise can be added to the generated replacement data values without having to do the data generation calculations twice. Thus, for a target image i, a texture image t, a mask M and a healing process SmoothHeal(image, mask) that has the property SmoothHeal(A, M)+SmoothHeal(B, M)=SmoothHeal (A+B, M), a textured healing process can be accomplished by implementing:

TextureHeal(i,t,M)=t+SmoothHeal(i−t,M),  (5)

instead of the more computationally expensive:

TextureHeal(i,t,M)=SmoothHeal(i,M)+(t−SmoothHeal (t,M)).  (6)

Equation (5) generally requires support for signed values in the healing process, which could be accomplished using conversion to fixed point numbers as described above, conversion to floating point numbers, or by application of an offset to the values before healing and subtracting the offset back out afterward. The techniques used to generate the new data values may be traditional techniques or the techniques discussed above in connection with FIGS. 1, 2A, 2B, 3A, 3B, 4.

Figure 6:
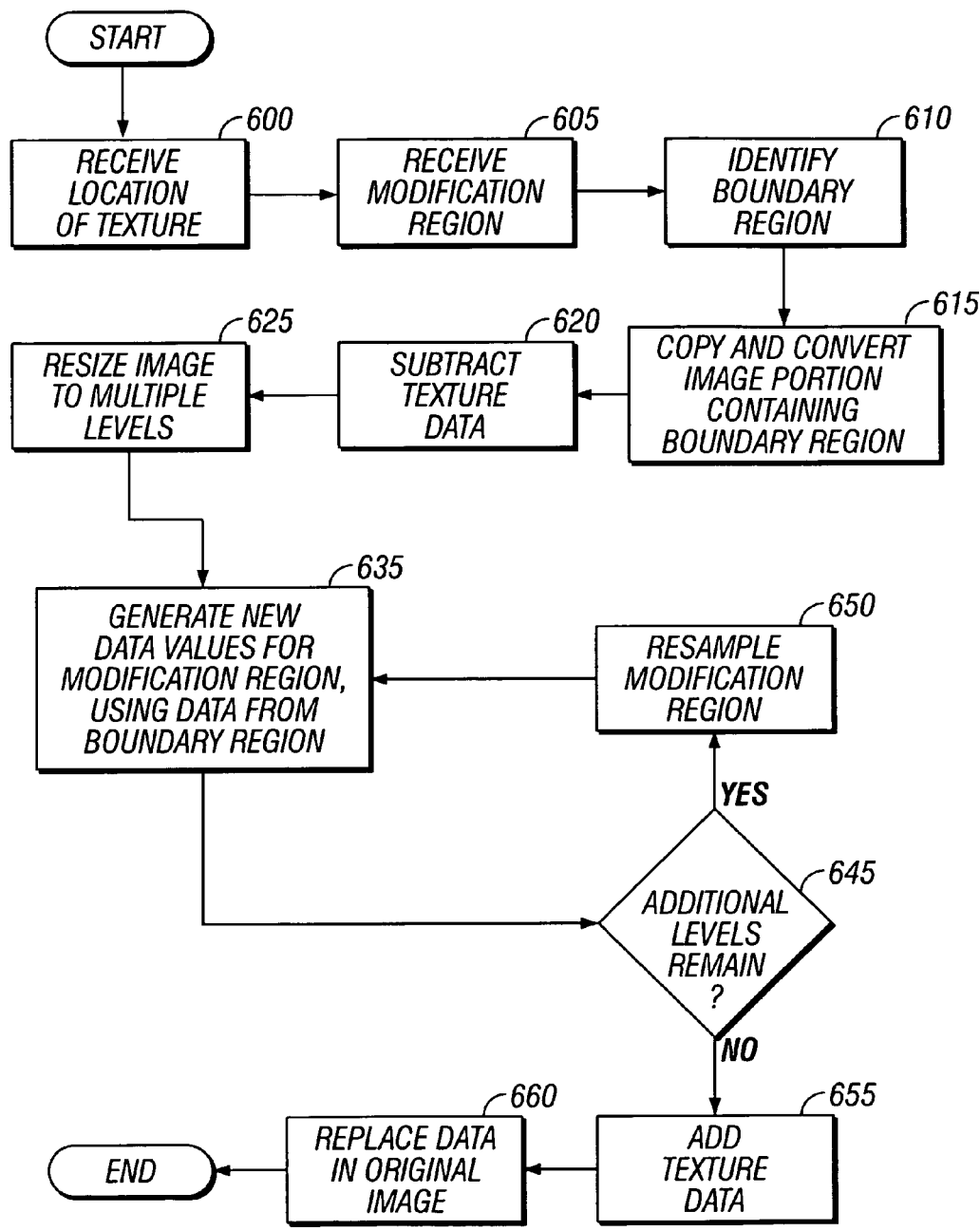
FIG. 6 shows an example process combining the processes of FIGS. 1 and 5 and the multiresolution processing of FIG. 2A.

FIG. 6 shows an example process combining the processes of FIGS. 1 and 5 and the multiresolution processing of FIG. 2A. In addition to the process shown and described, the process of FIG. 6 may also be combined with the tiling and/or the kernel application processes of FIGS. 2A and 2B. Referring now to FIG. 6, the process begins when a user-identified coordinate into the image to be modified, or another image, is received (600). The coordinate specifies a location of texture. Then, a user identified modification region is received (605). Thus, information is received that identifies a texture image, which can be part of the same image containing a target image to be healed, and a correspondence between the texture image and the target image.

Then, a boundary region for the modification region is identified (610). The size of the boundary region will depend on the techniques used to generate new pixel data. For example, if the techniques described above using the four kernels of FIG. 4 are used, then the boundary region will extend four pixels in each direction around the modification region.

Next, a portion of the image to be modified is copied and converted to a higher precision values (e.g., 32-bit fixed point values) (615). Alternatively, on a copy takes place here, and the conversion to a higher precision representation occurs before generation of new data values for each current level discussed below. Converting only a current level, instead of the whole image pyramid, to high precision saves high precision buffer space.

The image portion of the image that is copied contains the boundary region and the modification region and may be the whole image depending on the size of these regions. Then, texture data is subtracted from the image portion (620). The texture data used is determined by correlating the user-identified coordinate with a first point in the user-identified modification region. For example, if the modification region is identified using a brush tool, the first coordinate of the brush tool being $(m_{x0}, m_{y0})$, and the coordinate identifying a location of texture is $(p_{x0}, p_{y0})$, then the texture data coordinate $(p_{xi}, p_{yi})$ for each modification region data coordinate $(m_{xi}, m_{yi})$ is given by:

$$p_{xi}=p_{x0}-m_{x0}+m_{xi} \quad (7)$$

$$p_{yi}=p_{y0}-m_{y0}+m_{yi} \quad (8)$$

Moreover, as mentioned above, the location of texture and thus the texture data values subtracted may be obtained from an image other than the image to be modified.

Following this, the image portion is resized to multiple levels of lower resolution images, and a current level is set to the smallest (lowest resolution) level (625). Then, the boundary conditions for the modification region, in the current image level, are used to generate new data values for the identified region that result in continuous values and continuous change in values at the boundary (635).

Following this, a check is made to determine if additional levels remain to be processed (645). If levels remain, the modification region of the current level image is resampled to fill in the modification region of the lower level image, which then becomes the current level, before processing continues (650). Alternatively, the current level image may be resized to match the larger lower level image, and then the data values in the modification region of the resized image may then be copied into the modification region of the lower level image.

Additionally, prior to the generation of new data values for each image level, the current image level may be blurred slightly. For example, a sinc filter, an anisotropic blur or a Gaussian blur (0.5 pixel radius) can be applied. Alternatively, in the case where the process of FIG. 2B and the kernels of FIG. 4 are being used, the highest order kernel may be applied to the whole current level image (ignoring the current level mask) several times (e.g., four loops through the whole current level image) to effect this slight blurring. The pre-processing blur removes any very high frequency noise and can help prevent small color artifacts in the resulting healed image.

Once all the levels have been processed, texture data is added to the modification region in the image portion (655). As before, the texture data used is determined by correlating the user-identified coordinate with the first point in the user-identified modification region. Then, the new pixel data in the modification region of the image portion is converted to the original data type and saved in the original image (660).

Figure 7A:
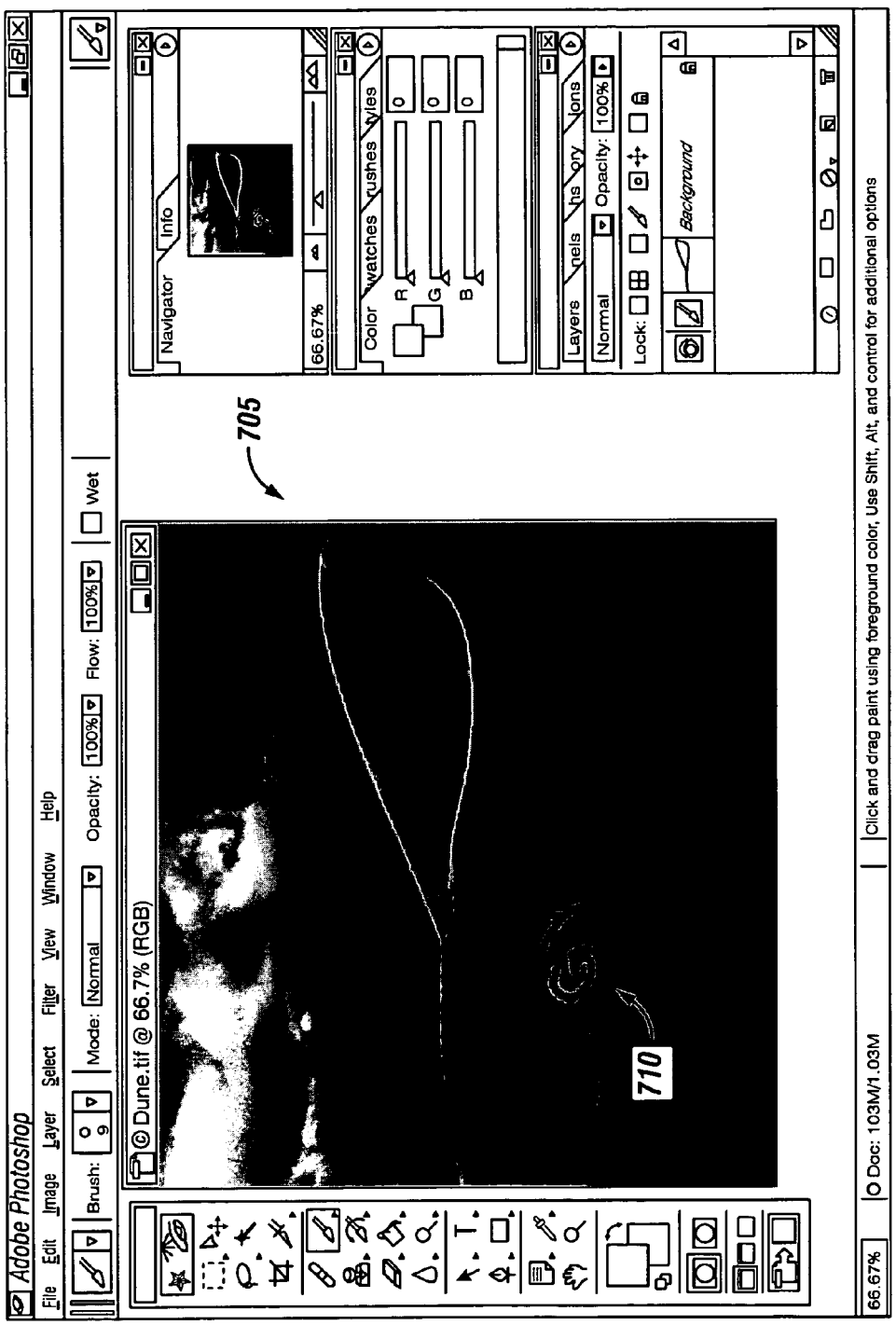
FIGS. 7A, 7B, 7C and 7D are illustrations of an image being modified using the process of FIG. 6.

FIGS. 7A, 7B, 7C and 7D are illustrations of an image being modified using the process of FIG. 6. Referring now to FIG. 7A, an image 705 is presented as part of a graphical user interface 700 for enabling modification of the image 705 in accordance with the process of FIG. 6. The image 705 includes graffiti 710, which in this example is an unwanted feature of the image.

Figure 7B:
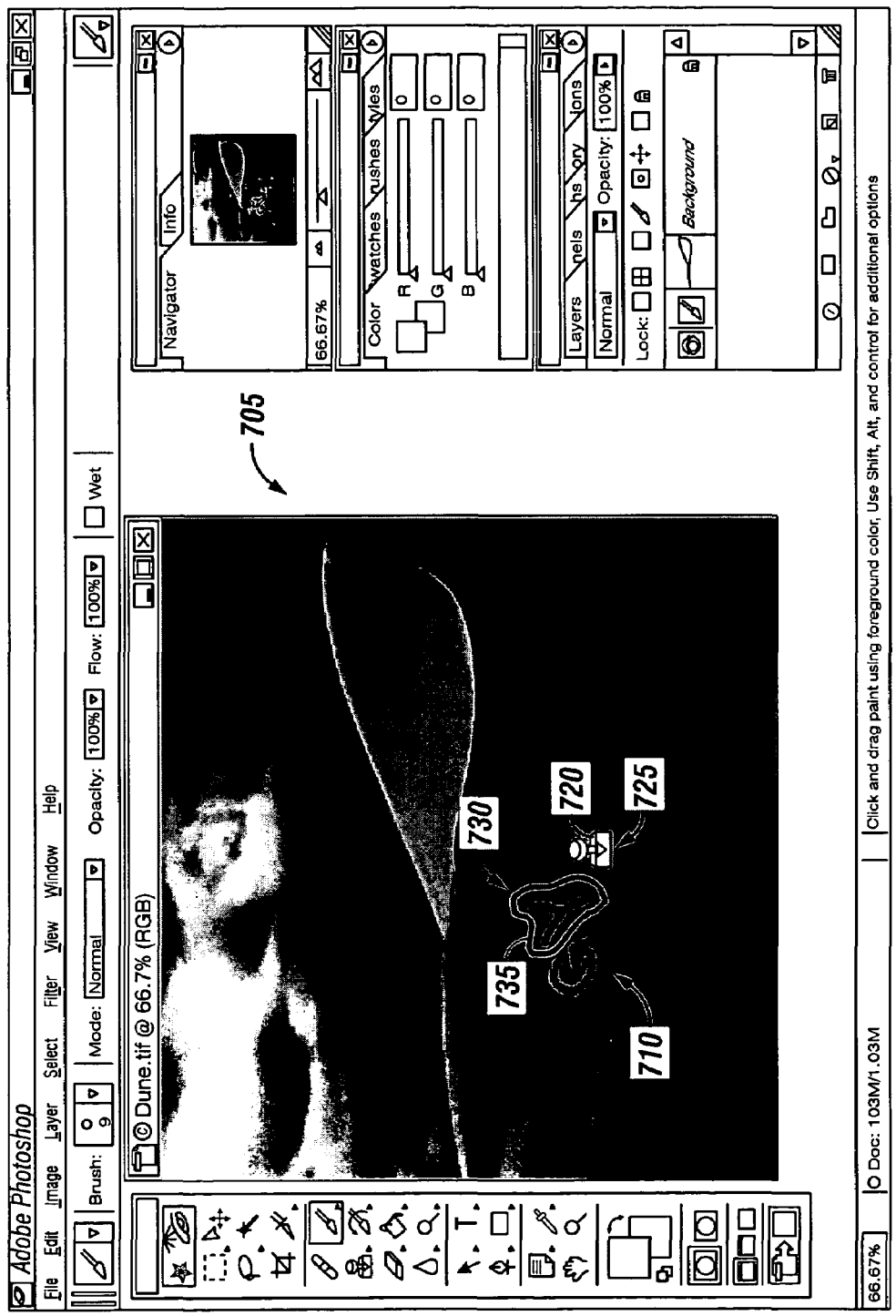

Referring now to FIG. 7B, a source coordinate 725 for texture data is specified using a stamp tool 720. A portion of the graffiti 710 is then specified to be removed by identification of a modification region 730, such as by using a brush tool. A correlation is made between the source coordinate 725 and the first point of identification of the modification region 730. In this example, the texture data is a large-scale texture, thus a proper relationship between the region 730 and the source coordinate 725 is important. Typically this relationship is identified by the user, who can decide what area of texture best approximates the type of texture that should be in the region 730 to be identified. If no such best approximation exists, a user may also specify a source coordinate 725 that lies in a separate image containing high frequency noise data.

Once the region 730 has been identified, the boundary 735 of the region 730 is determined. If the region 730 has been specified using a brush tool that represents a density function (e.g., it has fuzzy or feathered edges), the boundary 735 may be set to be the outer limits of the region 730, disregarding the density of the region 730. Once replacement data values have been generated, the density function may then be applied when replacing the data in the image 705 with the replacement data values. For example, the replacement data values may be mixed with the data in the image 705 with certain coefficients. In a linear case, the mask density is mapped to an interpolation value that interpolates between the original image values and the healed values. More sophisticated techniques also can be used for mixing the original image values and the healed values based on the mask density.

Figure 7C:
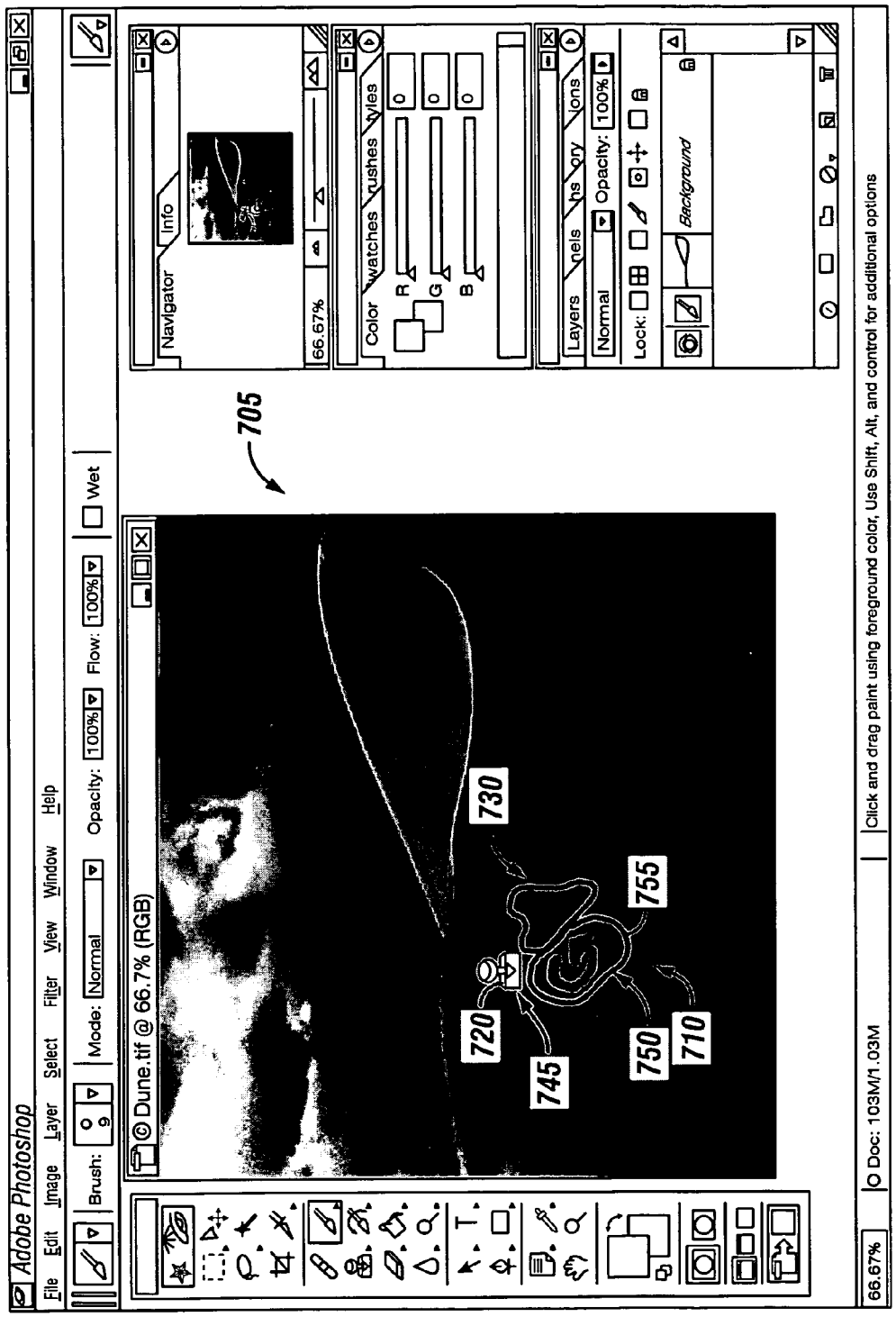

Referring now to FIG. 7C, the region 730 has now been healed. A new source coordinate 745 for texture data is specified using the stamp tool 720. A new portion of the graffiti 710 is then specified to be removed by identification of a new modification region 750. A correlation is made between the new source coordinate 745 and the first point of identification of the modification region 750.

Figure 7D:
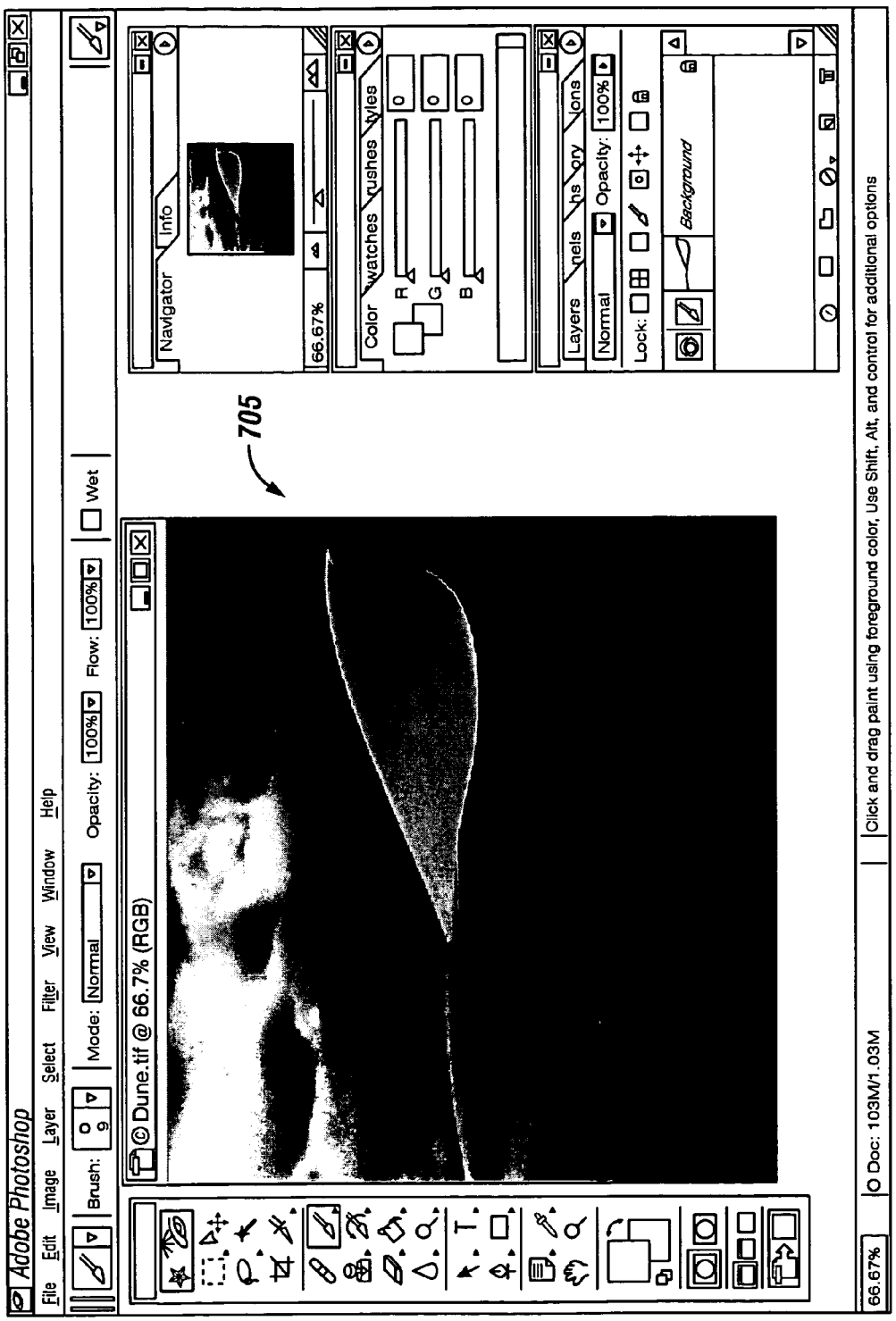

Referring now to FIG. 7D, the image 705 in the graphical user interface 700 has now been completely healed. The graffiti in the image 705 has been removed using the process of FIG. 6. The graffiti could have been removed by defining a single modification region. However, since the graffiti resided over a varying area of texture, better results were obtainable by specifying different texture data for the two different areas of the graffiti. Thus, by using the process of FIG. 6 in an iterative fashion, a user can perform finely detailed healing of an image with large unwanted features.

Various implementations of the systems and techniques described here may be realized in digital electronic circuitry, integrated circuitry, specially designed ASICs (application specific integrated circuits) or in computer hardware, firmware, software, or combinations thereof.

The logic flows depicted in FIGS. 1, 2A, 2B, 5 and 6 do not require the particular order shown. In certain implementations, multi-tasking and parallel processing may be preferable. Thus, other embodiments may be within the scope of the following claims.

What is claimed is:

1. A machine-implemented method comprising:
   subtracting texture pixel values from pixel values corresponding to at least a portion of an image;
   generating new pixel values for a modification region of the image using the texture-subtracted pixel values and one or more applied kernels that create a continuous rate of change in pixel values from boundary pixel values to new modification region pixel values, the boundary pixels comprising pixels in the image portion that bound the modification region; and
   adding the texture pixel values to the new pixel values of the image.

2. The method of claim 1, wherein the texture pixel values comprise user-selected texture pixel values.

3. The method of claim 1, wherein generating new pixel values comprises iteratively applying the one or more kernels at multiple resolutions of the image, starting with a lowest resolution version of the image.

4. The method of claim 3, further comprising breaking each resolution version of the image into one or more tiles before applying the one or more kernels, wherein the tiles overlap to provide padding when there are two or more tiles, the padding being large enough to accommodate a largest kernel from the one or more kernels.

5. The method of claim 3, further comprising:
   converting to a higher precision value representation before applying the one or more kernels; and
   blurring each resolution version of the image before applying the one or more kernels.

6. The method of claim 3, wherein the one or more kernels comprise at least one discretized Laplace operator.

7. The method of claim 1 wherein generating new pixel values comprises generating new pixel values for multiple channels to create similar overall gradations of color and illumination from the boundary pixel values to new modification region pixel values.

8. A software product tangibly stored on a machine-readable medium, the software product comprising instructions operable to cause a programmable processor to perform operations comprising:
   subtracting texture pixel values from pixel values corresponding to at least a portion of an image;
   generating new pixel values for a modification region of the image using the texture-subtracted pixel values and one or more applied kernels that create a continuous rate of change in pixel values from boundary pixel values to new modification region pixel values, the boundary pixels comprising pixels in the image portion that bound the modification region; and
   adding the texture pixel values to the new pixel values of the image.

9. The software product of claim 8, wherein the texture pixel values comprise user-selected texture pixel values.

10. The software product of claim 8, wherein generating new pixel values comprises iteratively applying the one or more kernels at multiple resolutions of the image, starting with a lowest resolution version of the image.

11. The software product of claim 10, wherein the operations further comprise breaking each resolution version of the image into one or more tiles before applying the one or more kernels, wherein the tiles overlap to provide padding when there are two or more tiles, the padding being large enough to accommodate a largest kernel from the one or more kernels.

12. The software product of claim 10, wherein the operations further comprise:
   converting to a higher precision value representation before applying the one or more kernels; and
   blurring each resolution version of the image before applying the one or more kernels.

13. The software product of claim 10, wherein the one or more kernels comprise at least one discretized Laplace operator.

14. The software product of claim 8, wherein generating new pixel values comprises generating new pixel values for multiple channels to create similar overall gradations of color and illumination from the boundary pixel values to new modification region pixel values.

15. A system comprising:
    means for interfacing with an image, including means for identifying a modification region in the image; and
    means for generating new pixel values for the modification region using boundary pixel values such that a rate of a rate of change in pixel values is minimized from the boundary pixel values to new modification region pixel values, the boundary pixel values being from boundary pixels that generally bound the modification region.

16. The system of claim 15, wherein the means for interfacing further includes means for obtaining texture pixel values, and the means for generating includes means for subtracting and adding the texture pixel values during generation of the new pixel values for the modification region.

17. The system of claim 15, wherein the means for generating includes means for generating new pixel values for multiple channels to create similar overall gradations of color and illumination from the boundary pixel values to new modification region pixel values.

18. The system of claim 15, wherein the means for generating includes means for iteratively applying one or more kernels at multiple resolutions of the image, and means for breaking each resolution version of the image into tiles before applying the one or more kernels.

19. The system of claim 18, wherein the means for generating further includes means for converting to a higher precision value representation before applying the one or more kernels, and means for blurring each resolution version of the image before applying the one or more kernels.

20. The system of claim 18, wherein the one or more kernels comprise a harmonic kernel, a biharmonic kernel, a triharmonic kernel, and a quadraharmonic kernel.

* * * * *